(12) United States Patent
Coonen et al.

(10) Patent No.: US 7,502,185 B2
(45) Date of Patent: Mar. 10, 2009

(54) METHOD AND SYSTEM FOR DETERMINING SPIN PAD LENGTH

(75) Inventors: Daniel Joseph Coonen, Longmont, CO (US); Kendall Hayne Fung, Longmont, CO (US)

(73) Assignee: Seagate Technology, LLC, Scotts Valley, CA (US)

( * ) Notice: Subject to any disclaimer, the term of this patent is extended or adjusted under 35 U.S.C. 154(b) by 217 days.

(21) Appl. No.: 10/939,258

(22) Filed: Sep. 10, 2004

(65) Prior Publication Data

US 2006/0056090 A1    Mar. 16, 2006

(51) Int. Cl.
    *G11B 5/09*    (2006.01)
(52) U.S. Cl. .......................................... 360/51; 360/48
(58) Field of Classification Search ........................ None
See application file for complete search history.

(56) References Cited

U.S. PATENT DOCUMENTS

| | | | |
|---|---|---|---|
| 3,824,563 A | 7/1974 | Lutz | |
| 4,656,532 A | 4/1987 | Greenberg et al. | |
| 5,210,660 A | 5/1993 | Hetzler | |
| 5,459,853 A | 10/1995 | Best et al. | |
| 5,583,724 A | 12/1996 | Kim et al. | |
| 5,963,392 A | 10/1999 | Sri-Jayantha et al. | |
| 6,091,559 A | 7/2000 | Emo et al. | |
| 6,237,070 B1 | 5/2001 | Ng | |
| 6,360,300 B1 | 3/2002 | Corcoran et al. | |
| 6,611,391 B1 * | 8/2003 | Murphy et al. | ................. 360/50 |
| 6,671,114 B2 | 12/2003 | Bang | |
| 6,900,955 B2 * | 5/2005 | Coonen | ....................... 360/48 |
| 2002/0118476 A1 | 8/2002 | Malone, Sr. | |
| 2002/0176193 A1 | 11/2002 | Coonen | |
| 2004/0059890 A1 | 3/2004 | Francis et al. | |

FOREIGN PATENT DOCUMENTS

WO    WO 91/19255    12/1991

* cited by examiner

*Primary Examiner*—Andrea Wellington
*Assistant Examiner*—Dan I Davidson
(74) *Attorney, Agent, or Firm*—Hensley Kim & Holzer, LLC

(57) ABSTRACT

Method and system for determining spin pad length in a data storage system. The data storage system has a data storage medium having at least one track for storing a plurality of data sections, a timing reference mark for the at least one track, and a recording head for writing the plurality of data sections on and for reading the plurality of data sections from the data storage medium. The data storage system further has a spin pad length determining mechanism for determining the length of a spin pad to be written on the at least one track as a function of distance from the timing reference mark during an operation of writing a data section on the at least one track. By writing spin pads of proper length on the at least one track, the total space occupied by the spin pads on the at least one track is minimized, thus providing additional space to store data.

20 Claims, 3 Drawing Sheets

METHOD AND SYSTEM FOR DETERMINING SPIN PAD LENGTH

FIELD OF THE INVENTION

The present invention relates generally to disc drive data storage systems. More particularly, the present invention relates to a method and system for determining spin pad length in a disc drive data storage system.

BACKGROUND OF THE INVENTION

In disc drive data storage systems, data is stored along tracks on a disc. In many systems, data is stored in blocks on the tracks to allow for localized error detection and correction during reading. Usually, the data blocks are grouped into sectors that are marked by a timing reference mark. In order to access a particular data block in a sector, such systems initiate a timer when the timing reference mark is detected. When the timer expires, the read/write head of the disc drive data storage system is assumed to be over the desired data block.

A problem that is encountered when using this indirect addressing scheme to locate a data block is that variations in the rotational speed of the disc and variations in the processing time required to identify the timing reference mark can cause an incorrect correlation between the timer and the actual position of the read/write head. As a result, the timer may expire before the read/write head reaches the data block or after the read/write head has already passed the beginning of the data block.

In order to prevent one data section from being written onto another data section as a result of an incorrect correlation between the timer and the actual position of a write head, it is known to insert empty buffer fields, known as spin pads, between the data blocks on a track. In most disc drive data storage systems, all the spin pads along a track have the same length. The required length of a spin pad to ensure that one data section is not written onto another data section, however, is a function of the distance of the spin pad from the timing reference mark, such that the greater the distance of a spin pad from the timing reference mark, the greater the required length of the spin pad. As a result, in disc drive data storage systems that use a fixed pad length, the spin pads between all data blocks must have a length that is as long as the longest spin pad length that is required. The use of unnecessarily long spin pads between most data blocks takes up space that could otherwise be used to store data, and is an obstacle to increasing data capacity in a disc drive data storage system.

In commonly assigned, copending application entitled "METHOD AND APPARATUS PROVIDING VARIABLE SPIN-PAD LENGTHS", Ser. No. 09/977,098, filed Oct. 12, 2001, a disc drive data storage system is disclosed that includes a track layout having spin pads of different length between different data blocks. The length of each spin pad on a track is a function of the distance of the spin pad from the timing reference mark, and the length of each spin pad increases as the distance of the spin pad from the timing reference mark increases.

By varying the length of the spin pads as a function of distance from the timing reference mark, the total space occupied by the spin pads on a track is reduced, thus providing additional space on the track to store data.

In order to maximize the space available on a track to store data, the length of each spin pad on a track should be only as long as is required to prevent alignment errors. The above-mentioned commonly assigned copending application describes methods for calculating the proper lengths of spin pads to be written on a track as a function of distance of the spin pads from a timing reference mark. It would be desirable, however, to provide a disc drive data storage system that includes a mechanism for determining the length of a spin pad to be written on a track as a function of distance from a timing reference mark during an operation of writing a data section on the track. The present invention provides a solution to this and other problems, and offers other advantages over previous solutions.

SUMMARY OF THE INVENTION

The present invention provides a method and system for determining spin pad length in a data storage system which solves the above-mentioned problems. The data storage system includes a data storage medium having at least one track for storing a plurality of data sections, a timing reference mark for the at least one track, and a recording head for writing the plurality of data sections on and for reading the plurality of data sections from the data storage medium. The data storage system further includes a spin pad length determining mechanism for determining the length of a spin pad to be written on the at least one track as a function of distance from the timing reference mark during an operation of writing a data section on the at least one track. By writing spin pads of proper length on the at least one track, the total space occupied by the spin pads on the at least one track is minimized, thus providing additional space to store data.

These and various other features as well as advantages which characterize the present invention will be apparent upon reading of the following detailed description and review of the associated drawings.

DETAILED DESCRIPTION

Figure 1:
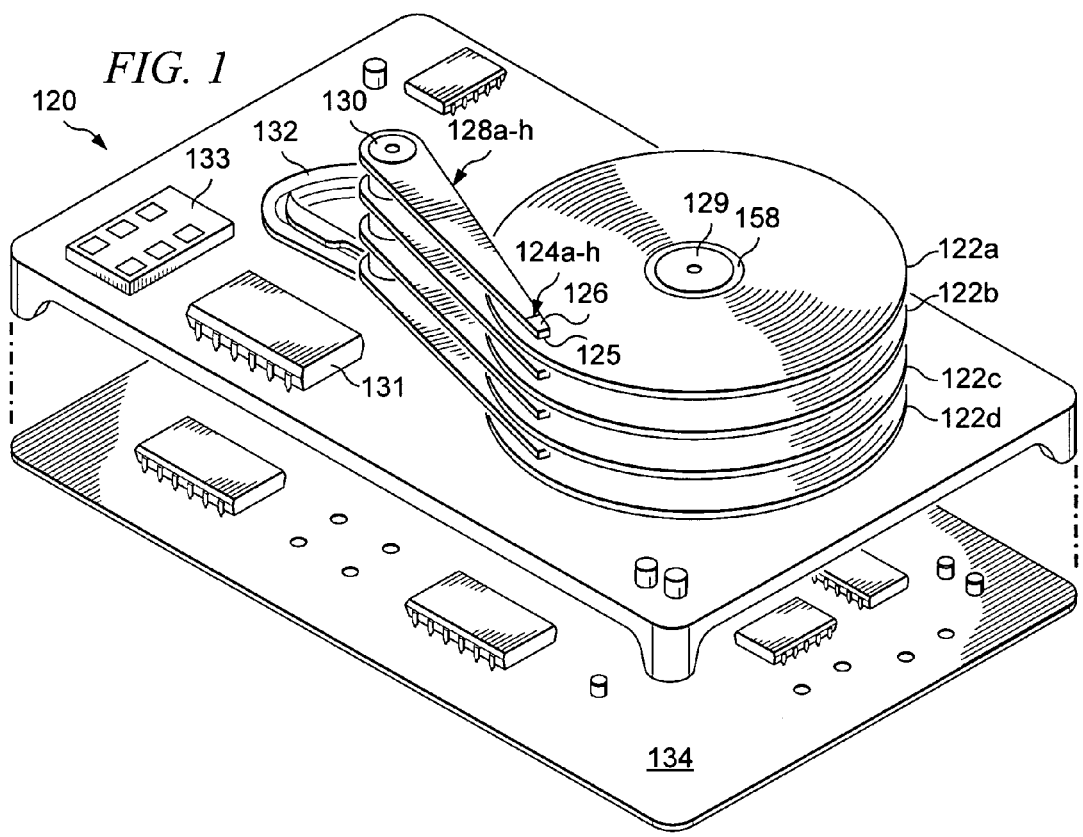
FIG. 1 is an isometric view that illustrates a disc drive data storage system in which embodiments of the present invention may be practiced.

As discussed above, the present invention provides a method and system for determining spin pad length in a disc drive data storage system. Referring now to FIG. 1, an isometric view of a disc drive data storage system is shown in which embodiments of the present invention may be implemented. FIG. 1 is an illustration of an example of a disc drive data storage system designated generally by reference number 120. Disc drive data storage system 120 includes a stack of storage discs 122a-d and a stack of recording heads (read/write heads) 124a-h. In the depicted example, recording heads are shown only on the top surface of each disc of the disc driver for simplicity and clarity, however, it should be understood that additional recording heads are typically provided for the bottom surfaces of each disc as well. Each of storage discs 122a-d is provided with a plurality of tracks to store user data. As illustrated in FIG. 1, one recording head is provided for each surface of each of discs 122a-d such that data can be read from or written to the tracks of all of the storage discs. The recording heads are coupled to pre-amplifier 131.

Storage discs 122a-d are mounted for rotation by a spindle motor arrangement 129, as is known in the art. Moreover, recording heads 124a-h are supported by respective actuator arms 128a-h for controlled positioning over preselected radii of storage discs 122a-d to enable the reading and writing of data from and to the tracks. To that end, actuator arms 128a-h are rotatably mounted on a pin 130 by a voice coil motor 132 operable to controllably rotate actuator arms 128a-h radially across the disc surfaces. Alternatively, actuator arms 128a-h could be mounted for linear movement across the disc surfaces.

Each of recording heads 124a-h is mounted to a respective actuator arm 128a-h by a flexure element (not shown) and comprises a magnetic transducer 125 mounted to a slider 126 having an air bearing surface (not shown), all in a known manner. As typically utilized in disc drive data storage systems, sliders 126 cause magnetic transducers 125 of recording heads 24a-h to "fly" above the surfaces of the respective storage discs 122a-d for non-contact operation of disc drive data storage system 120, as discussed above. When not in use, voice coil motor 132 rotates actuator arms 128a-h during a contact stop operation, to position recording heads 124a-h over a landing zone 158, where recording heads 124a-h come to rest on the storage disc surfaces. Alternatively, a ramp/load disc drive mechanism may also be used. As should be understood, each of recording heads 124a-h is at rest on a landing zone 158 at the commencement of a contact start operation.

A printed circuit board (PCB) 134 is provided to mount control circuits for controlled operation of spindle motor 129 and voice coil motor 132. PCB 134 also includes read/write channel circuitry coupled to recording heads 124a-h via pre-amplifier 131, to control the transfer of data to and from the tracks of storage discs 122a-d. The manner for coupling PCB 134 to the various components of the disc drive data storage system is well known in the art, and includes connector 133 to couple the read/write channel circuitry to pre-amplifier 131.

Figure 2:
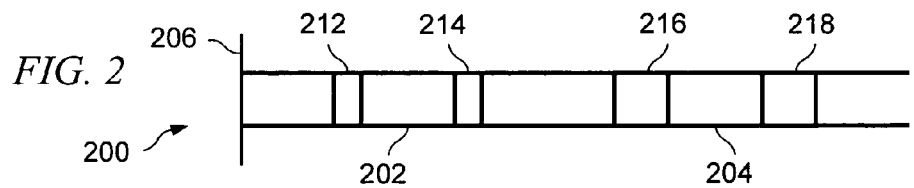
FIG. 2 schematically illustrates a layout of a track on a disc in a disc drive data storage system in accordance with one exemplary embodiment of the present invention.

FIG. 2 schematically illustrates a layout of a track on a disc in a disc drive data storage system in accordance with one exemplary embodiment of the present invention. The track may, for example, be implemented on one of discs 122a-122d in disc drive data storage system 120 illustrated in FIG. 1.

The track is generally designated by reference number 200 and includes a plurality of data sections, 202 and 204 positioned at different distances from a timing reference mark 206. Although two data sections are illustrated in FIG. 2, it should be understood, that the present invention is not limited to a track having any particular number of data sections. In a typical disc, for example, from three to five data sections may be provided on a track between timing reference marks. A track can have, for example, from 80-400 timing reference marks. Data sections 202 and 204 each comprises a block of recorded data, although it should be understood that data sections may also include empty regions to allow data from one data block to be fully processed before data is read from the next data block.

The track layout illustrated in FIG. 2 also includes a spin pad comprised of two spin pad portions for each of data sections 202 and 204. In particular, a start spin pad portion 212 is positioned on track 200 immediately before data section 202, and an end spin pad portion 214 is positioned on track 200 immediately after data section 202. Similarly, start and end spin pad portions 216 and 218 are positioned on track 200 immediately before and immediately after data section 204, respectively.

As is apparent from FIG. 2, the length of the spin pad comprised of spin pad portions 212 and 214 before and after data section 202 is shorter than the length of the spin pad comprised of spin pad portions 216 and 218 before and after data section 204. As discussed previously, the spin pads are provided to ensure that one data section is not written onto another data section during an operation of writing the data sections on track 200, and the required lengths of the spin pads to prevent overwriting is a function of their distance from timing reference mark 206 with the length of the spin pads increasing as the distance from the timing reference mark increases. Since data section 202 is closer to timing reference mark 206 than data section 204, the spin pad comprising spin pad portions 212 and 214 is shorter than the spin pad comprising spin pad portions 216 and 218.

In order to maximize the space available on track 200 to store data, the lengths of spin pad portions 212, 214, 216 and 218 should be only as long as is required to prevent alignment errors. In accordance with preferred embodiments of the present invention, a disc drive data storage system is provided that includes a spin pad length determining mechanism for determining the length of a spin pad to be written on a track as a function of distance from the timing reference mark during an operation of writing a data section on the track.

Figure 3:
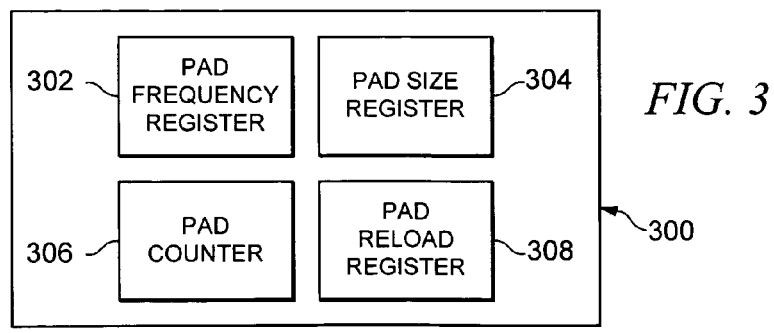
FIG. 3 is a block diagram that schematically illustrates a spin pad length determining mechanism in accordance with one exemplary embodiment of the present invention.

FIG. 3 is a block diagram that schematically illustrates a spin pad length determining mechanism in accordance with one exemplary embodiment of the present invention. The spin pad determining mechanism is generally designated by reference number 300, and may, for example, be implemented in control circuits in PCB 134 in disc drive data storage system 100 illustrated in FIG. 1.

In particular, as shown in FIG. 3, spin pad length determining mechanism 300 includes spin pad frequency register 302, spin pad size register 304, spin pad counter 306, and, optionally, spin pad reload register 308. Spin pad frequency register 302 stores a frequency, referred to as SPAD_FREQ, at which spin pad size is to be increased. Spin pad size register 304 stores a current pad size (in arbitrary units), referred to as CURR_PAD. Spin pad counter 306 is an internal periodic counter that counts a number of times a set time period has elapsed, referred to as SPAD_CNTR, following passing of the recording head of the of the disc drive data storage system over the timing reference mark. Spin pad reload register 308 is a register that stores a length, referred to as SPAD_RELOAD, of additional pads of fixed length which may be optionally written on a track in addition to the variable length spin pads to compensate for non-linear variations in the relative movement of the track and the recording head.

In accordance with one preferred embodiment of the present invention, the size of a spin pad to be written on a track during an operation of writing a data section on the track is determined using registers 302 and 304 and counter 306 as follows: During a recording operation, when the recording head passes the timing reference mark, CURR_PAD in register 302 is initialized to 1 (1 being an arbitrary number representing a pad length for a spin pad immediately following the timing reference mark, i.e., a shortest spin pad length), and SPAD_CNTR in counter 306 is initialized to zero. As will be described more fully hereinafter, if spin pad reload register 308 is being utilized, SPAD_CNTR is initialized to SPAD_RELOAD. When the recording head passes the timing reference mark during a recording operation, spin pad counter 306 begins counting the set time periods, and every time SPAD_CNTR reaches SPAD_FREQ stored in register 302, CURR_PAD is incremented by one and SPAD_CNTR is reset to zero.

During a writing operation, whenever, the recording head writes a data section on a track, a spin pad having twice the length indicated by CURR_PAD is also written on the track (i.e., a start spin pad portion and an end spin pad portion, each having a length equal to CURR_PAD are written immediately before and immediately after the data section, respectively). Thereafter, during a reading operation, the disc drive data storage system delays reading by the read head by CURR_PAD (i.e., by the length of the start spin pad portion) so that the read head will be over the data section during the reading operation.

Figure 4:
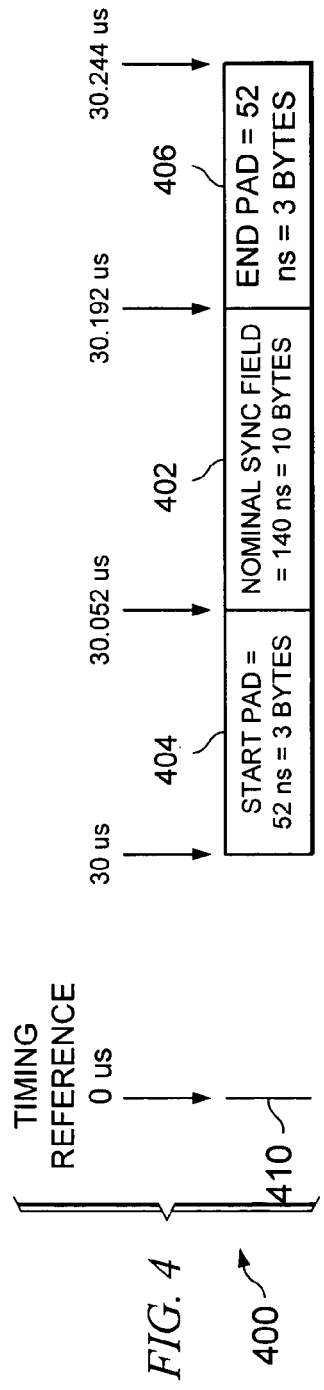
FIG. 4 is a diagram that schematically illustrates an example of desired timing with variable length spin pads in accordance with one exemplary embodiment of the present invention.

FIG. 4 is a diagram that illustrates an example of desired timing with variable length spin pads in accordance with one embodiment of the present invention. In particular, FIG. 4 illustrates a synchronization field 400 that comprises a sync pattern 402 having a specified length (also referred to as a nominal synchronization field), and a start spin pad portion is 404 and an end spin pad portion 406 immediately before and immediately after sync pattern 402. Synchronization field 400 is at some distance from reference timing mark 410. In the example shown in FIG. 4:

| | |
|---|---|
| SPAD_CNTR: | 5 ns period |
| Byte clock: | 14 ns period (the smallest size amount by which media timing can be varied) |
| Speed variations: | 0.1% |
| Nominal Sync field size: | 10 Bytes = 140 ns |

A sync field that nominally starts at 30 µs needs 0.001×30 µs=30 ns of spin pad. The clock resolution is 14 ns so the spin pad must round up to 52 ns.

For the above example, FIG. 4 illustrates the desired timing with spin pads.
SPAD_FREQ=Byte clock/(speed variation×SPAD_CNTR period)
=14 ns/(0.001×5 ns)
=2800

For Writing:

As indicated above, whenever the recording head writes a synchronization field, it should add 2×CURR_PAD to the base synchronization field size. Pursuant to this requirement, at 30 µs, SPAD_CNTR will have gone through 6000 cycles (30,000 ns/5 ns SPAD_CNTR period). CURR_PAD will have incremented twice (once at 2800, again at 5600) and will be 3. Accordingly, the system will write 10 bytes (for synch pattern 402)+6 bytes of spin pad (3 bytes for start spin pad portion 404 and 3 bytes for end spin pad portion 406) as shown in FIG. 4.

For Reading:

As indicated above, whenever the recording head turns on its reader, reading is delayed by CURR_PAD. In this example, CURR_PAD is 3, and the reading head thus delays reading until 30.052 µs, when the reading head has passed start spin pad portion 404.

By using registers 302 and 304, and counter 306, spin pad size at any distance from timing reference mark 410 can be readily determined during an operation of writing a synchronization field on a track, and the proper time to activate the reading head can be quickly determined during an operation of reading data from a data section of the synchronization field.

In the example illustrated in FIG. 4, the length of a spin pad varies linearly as a function of distance from the timing reference mark. There are situations in which the system may require pad as a result of clock jitter or for other reasons that do not vary linearly with distance from the timing reference mark. If the pad is symmetrical, (read start should be targeted in the middle of the pad), the need for additional pad can be accounted for by initializing SPAD_CNTR to a non-zero value at each timing reference mark. This can be done by providing pad reload register 308 in mechanism 300 as shown in FIG. 3. Pad reload register 308 stores a length of fixed pads to be written on a track, referred to as SPAD_RELOAD, in addition to the variable length spin pads to account for any non-linear variations in relative movement between the recording head and the track during a writing operation. If the pad is not symmetrical, the non-linear variations can be accommodated by shifting the read pulse relative to the write pulse in addition to mechanism 300.

Figure 5:
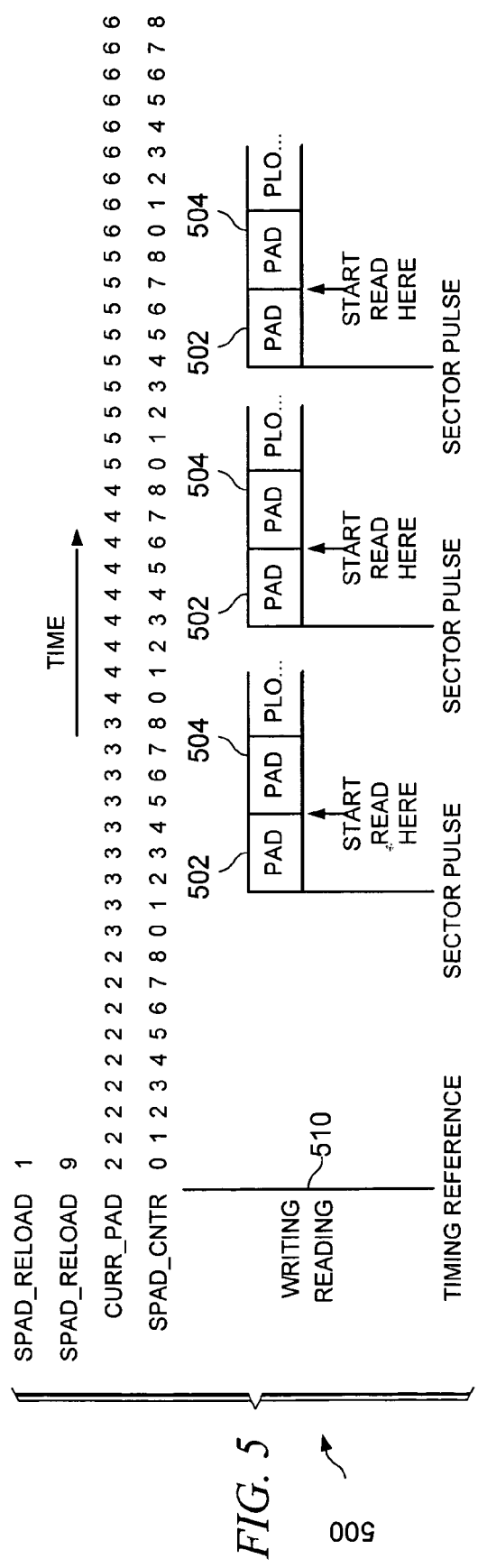
FIG. 5 is a diagram that schematically illustrates an example of desired timing with fixed-length pads in addition to variable length spin pads in accordance with one exemplary embodiment of the present invention.

FIG. 5 is a diagram that schematically illustrates an example of desired timing 500 with fixed-length pads 502 in addition to variable length spin pads 504 in accordance with one exemplary embodiment of the present invention. Pads 502 result from the SPAD_RELOAD value used to initialize CURR_PAD and spin pads 504 result from how CURR_PAD has incremented since being loaded with SPAD_RELOAD.

Figure 6:
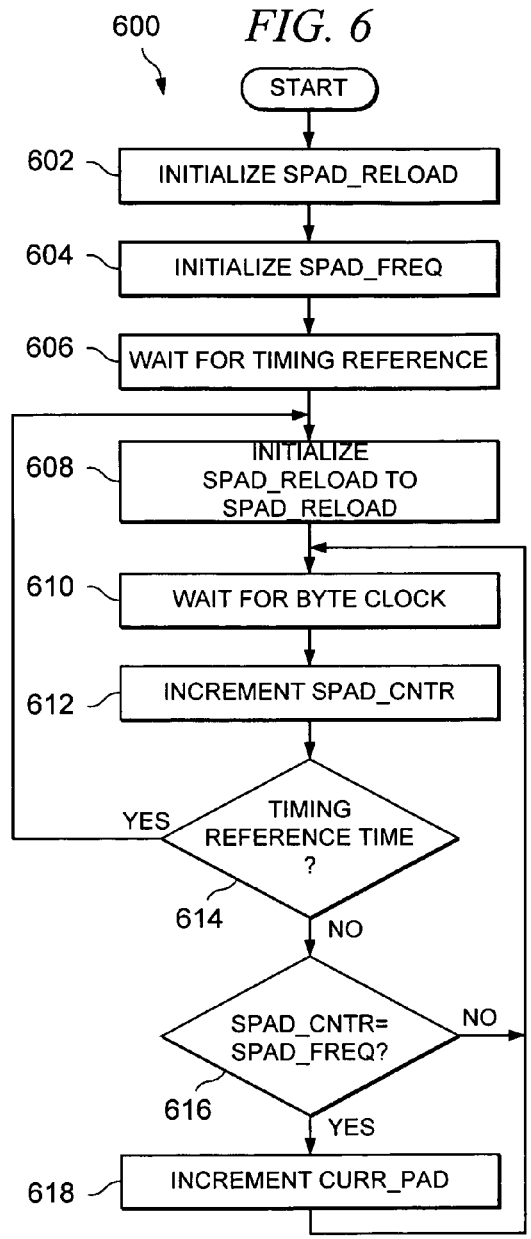
FIG. 6 is a flowchart that illustrates a method for determining spin pad length in a disc drive data storage system in accordance with one exemplary embodiment of the present invention.

FIG. 6 is a flowchart that illustrates a method for determining spin pad length in a disc drive data storage system in accordance with one exemplary embodiment of the present invention. The method is generally designated by reference number 600 and, after starting, SPAD_RELOAD is initialized (step 602). SPAD_FREQ is then initialized (step 604), and the method waits until the recording head reaches the timing reference mark (step 606). SPAD_CNTR is then initialized to SPAD_RELOAD (step 608), and the method waits for the byte clock (step 610). SPAD_CNTR is then incremented (step 612). It is then checked to see if the timing reference time has been reached (step (614). If the timing reference time has been reached (Yes output of step 614), the method returns to initialize SPAD_CNTR to SPAD_RELOAD (step 608). If the timing reference time has not been reached (No output of step 614), it is determined if SPAD_CNTR=SPAD_FREQ (step 616). If Yes, CURR_PAD is incremented (step 618), and the method returns to step 610 to wait for the byte clock. If SPAD_CNTR does not equal SPAD_FREQ (No output of step 616), the method returns directly to step 610 to wait for the byte clock.

Figure 7:
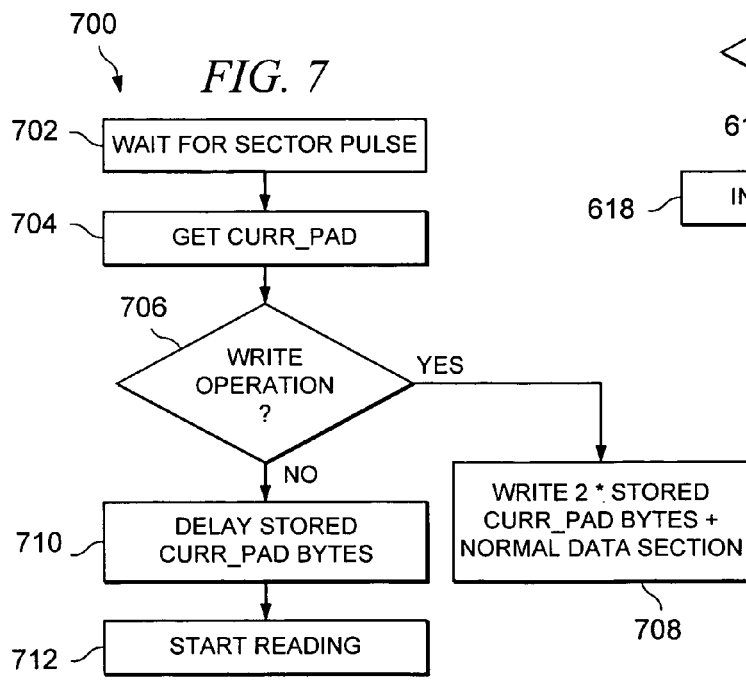
FIG. 7 is a flowchart that illustrates a method or writing data on and reading data from a track on a disc in a disc drive data storage system in accordance with one exemplary embodiment of the present invention.

FIG. 7 is a flowchart that illustrates a method or writing data on and for reading data from a track on a disc in a disc drive data storage system in accordance with one exemplary embodiment of the present invention. The method is generally designated by reference number 700, and begins by waiting for a sector pulse (step 702). The CURR_PAD is then obtained (step 704) and it is determined if the operation is a write operation (step 706). If the operation is a write operation (Yes output of step 706), write 2 times the stored CURR_PAD bytes plus normal data section length (step 708). If the operation is a read operation (No output of step 706), reading is delayed by the stored CURR_PAD bytes (step 710) and, thereafter, reading is begun (step 712).

It should be noted that CURR_PAD is normally stored when a sector pulse comes in. This step can be omitted, if desired, resulting in writing two different size pads of CURR_PAD increments while writing the first pad.

Thus, the present invention provides a method and system for determining spin pad length in a data storage system. The data storage system includes a data storage medium having at least one track for storing a plurality of data sections, a timing reference mark for the at least one track, and a recording head for writing the plurality of data sections on and for reading the plurality of data sections from the data storage medium. The data storage system further includes a spin pad length determining mechanism for determining the length of a spin pad to be written on the at least one track as a function of distance from the timing reference mark during an operation of writing a data section on the at least one track. By writing spin pads of proper length on the at least one track, the total space occupied by the spin pads on the at least one track is minimized, thus providing additional space to store data.

What is claimed is:

1. A data storage system, comprising:
    a data storage medium having at least one track comprising a plurality of timing reference marks and a plurality of data sectors; and
    a spin pad length determining mechanism for determining a length of each spin pad to be written on the at least one track as a function of distance between a location of the spin pad and a timing reference mark immediately preceding the location of the spin pad during an operation of writing a data section on the at least one track.

2. The data storage system of claim 1, wherein the spin pad length determining mechanism is in a control circuit of the data storage system.

3. The data storage system of claim 1, wherein the spin pad length determining mechanism includes a spin pad size register for storing a cunent spin pad length, and wherein the length of a spin pad to be written on the at least one track during the operation of writing a data section on the at least one track equals twice the stored current spin pad length.

4. The data storage system of claim 3, wherein the spin pad to be written on the at least one track includes a start spin pad portion before the data section and an end spin pad portion following the data section, the start spin pad portion and the end spin pad portion each having the stored current spin pad length.

5. The data storage system of claim 3, wherein the spin pad length determining mechanism further includes a spin pad frequency register for storing a frequency at which spin pad length is to be increased, and a counter for counting a number of time periods elapsed following passing of the recording head over the timing reference mark, and wherein the spin pad size register is incremented each time a count in the counter equals the frequency stored in the frequency register.

6. The data storage system of claim 3, wherein the spin pad length determining mechanism further includes a reload register for storing a length of a pad of fixed length to be written on the at least one track.

7. The data storage system of claim 1, wherein the data storage medium comprises a disc having a plurality of tracks.

8. A method comprising: providing a plurality of timing reference marks and a plurality of data sections on at least one track of a data storage medium; and
    determining a length of each spin pad to be written on the at least one track as a function of distance between a location of the spin pad and a timing reference mark immediately preceding the location of the spin pad during an operation of writing a data section on the at least one track.

9. The method of claim 8, wherein the writing of a data section comprises writing a spin pad having a length that is twice the stored current spin pad length.

10. The method of claim 9, wherein the spin pad includes a start spin pad portion and an end spin pad portion, and wherein writing a spin pad comprises writing the start spin pad portion before the data section and writing the end spin pad portion following the data section.

11. The method of claim 10, wherein the length of the start spin pad portion and the length of the end spin pad portion each equals the stored current spin pad length.

12. The method of claim 8 further comprising storing in a spin pad size register the current spin pad length, storing in a spin pad frequency register a frequency at which spin pad length is to be increased, and maintaining a counter for counting a number of time periods elapsed following passing of a recording head over the timing reference mark, wherein the method further includes incrementing the current spin pad length stored in the spin pad register each time a count in the counter equals the frequency stored in the frequency register.

13. The method of claim 8, and further including storing a length of a pad of fixed length to be written on the track during the operation of writing a data section on the at least one track.

14. The method of claim 10, and further including delaying start of reading by a length conesponding to the stored current spin pad length during a reading operation.

15. The method of claim 8, wherein the data storage medium comprises a disc having a plurality of tracks.

16. A method comprising:
    writing a plurality of spin pads on a track of a data storage medium, each of the spin pads written adjacent to a data section; and
    computing a spin pad length of each respective spin pad based on a distance between a location of the spin pad and a timing reference mark immediately preceding the location of the spin pad during an operation of writing the data section, wherein the track comprises a plurality of timing reference marks.

17. The method of claim 16, wherein the spin pad includes a start spin pad portion written before the data section and an end spin pad portion written following the data section.

18. The method of claim 16, wherein the spin pad including a start spin pad portion before the data section and an end spin pad portion following the data section, each of the start spin pad portion and the end spin pad portion having a spin pad portion length computed as a function of a number of set time periods elapsing between a time a recording head passes the timing reference mark of the track and a time the recording head reaches the location on the track.

19. The method of claim 16 further comprising:
    delaying a start of reading the data section at the location by a time period corresponding to a length of a start spin pad portion during a reading operation.

20. The method of claim 16 further comprising:
    reading the spin pad length from a register of control circuitry of a data storage system that includes the data storage medium.

* * * * *